Feb. 7, 1928.
J. W. OOSTERINK ET AL
1,658,687
SHOCK FORMING ATTACHMENT FOR HARVESTERS
Filed Oct. 23, 1925
5 Sheets-Sheet 1
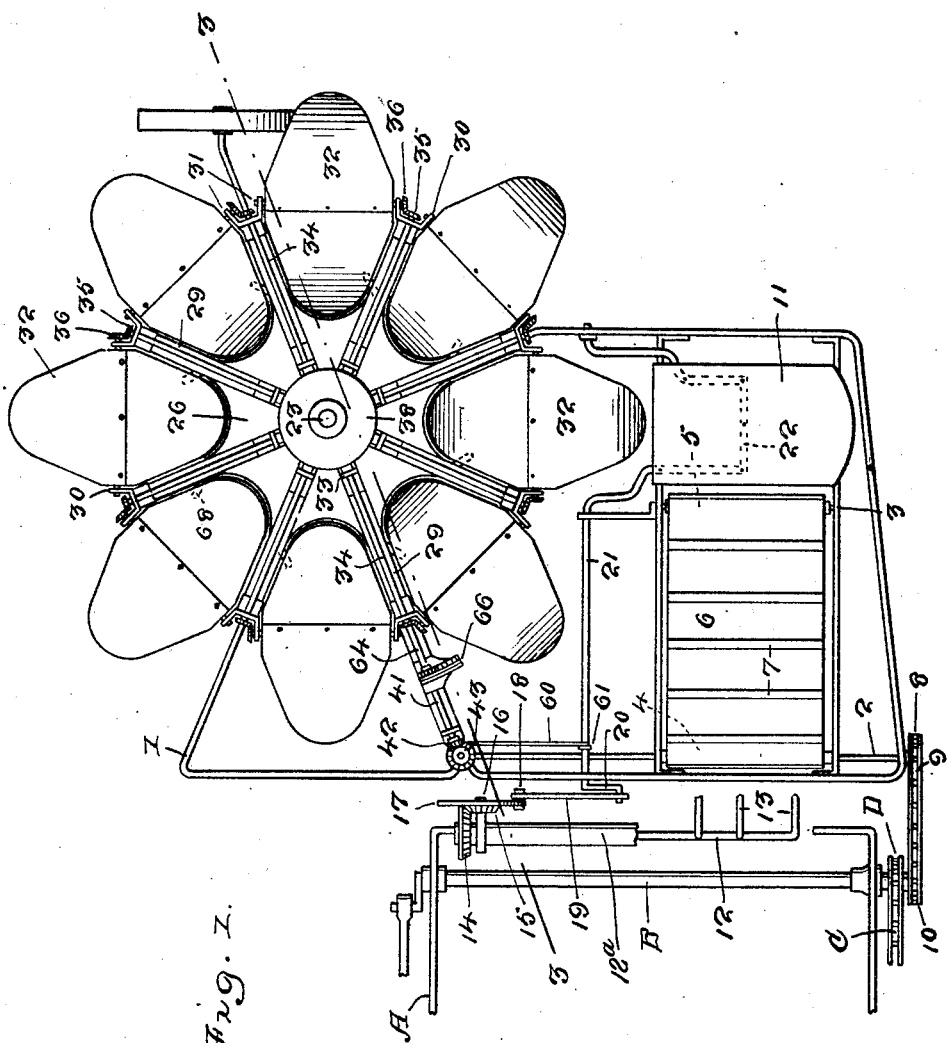
WITNESS:
E. R. Ruppert.
INVENTOR
J. W. Oosterink
F. J. Rowland
BY Victor J. Evans
ATTORNEY

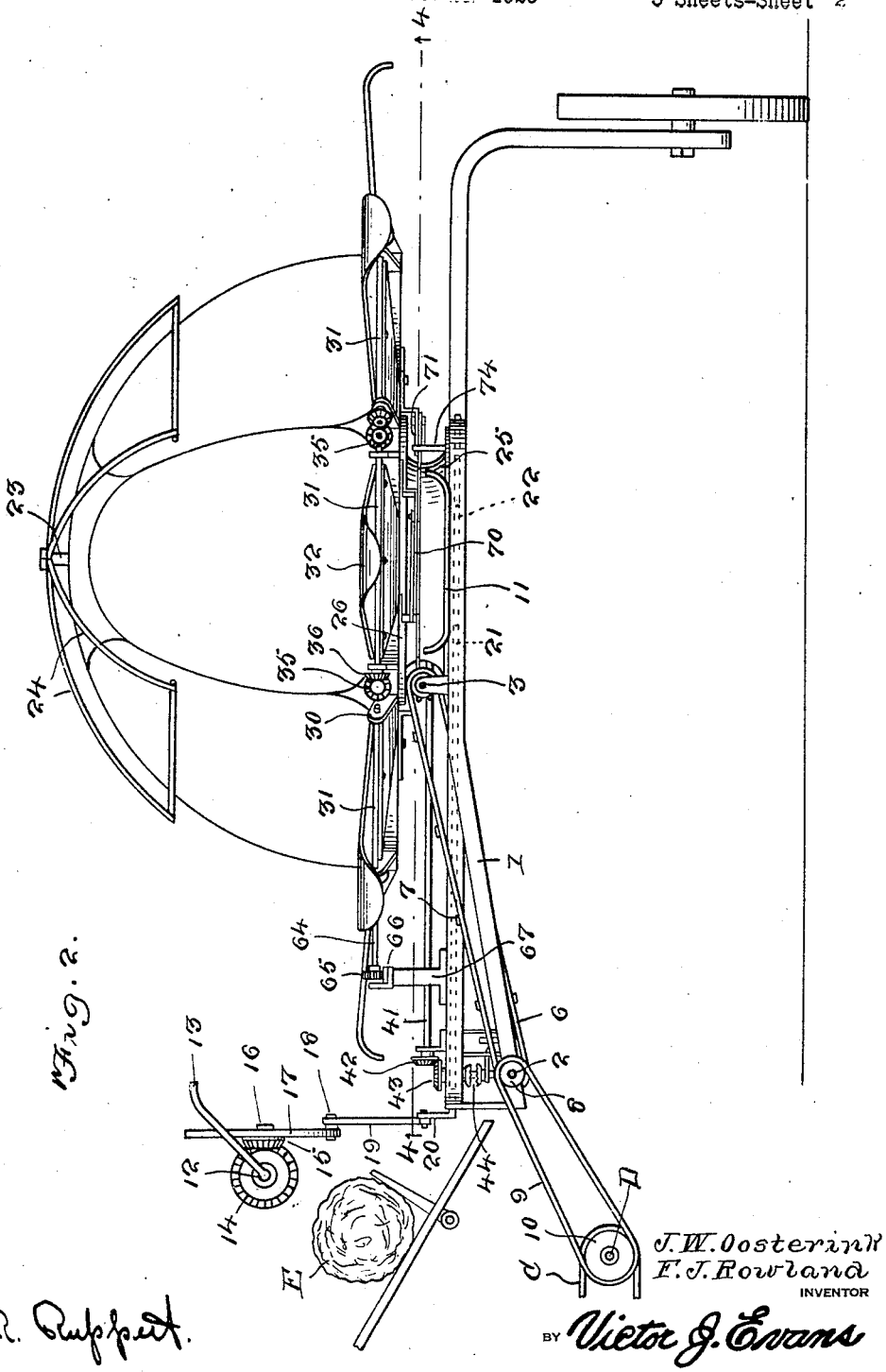

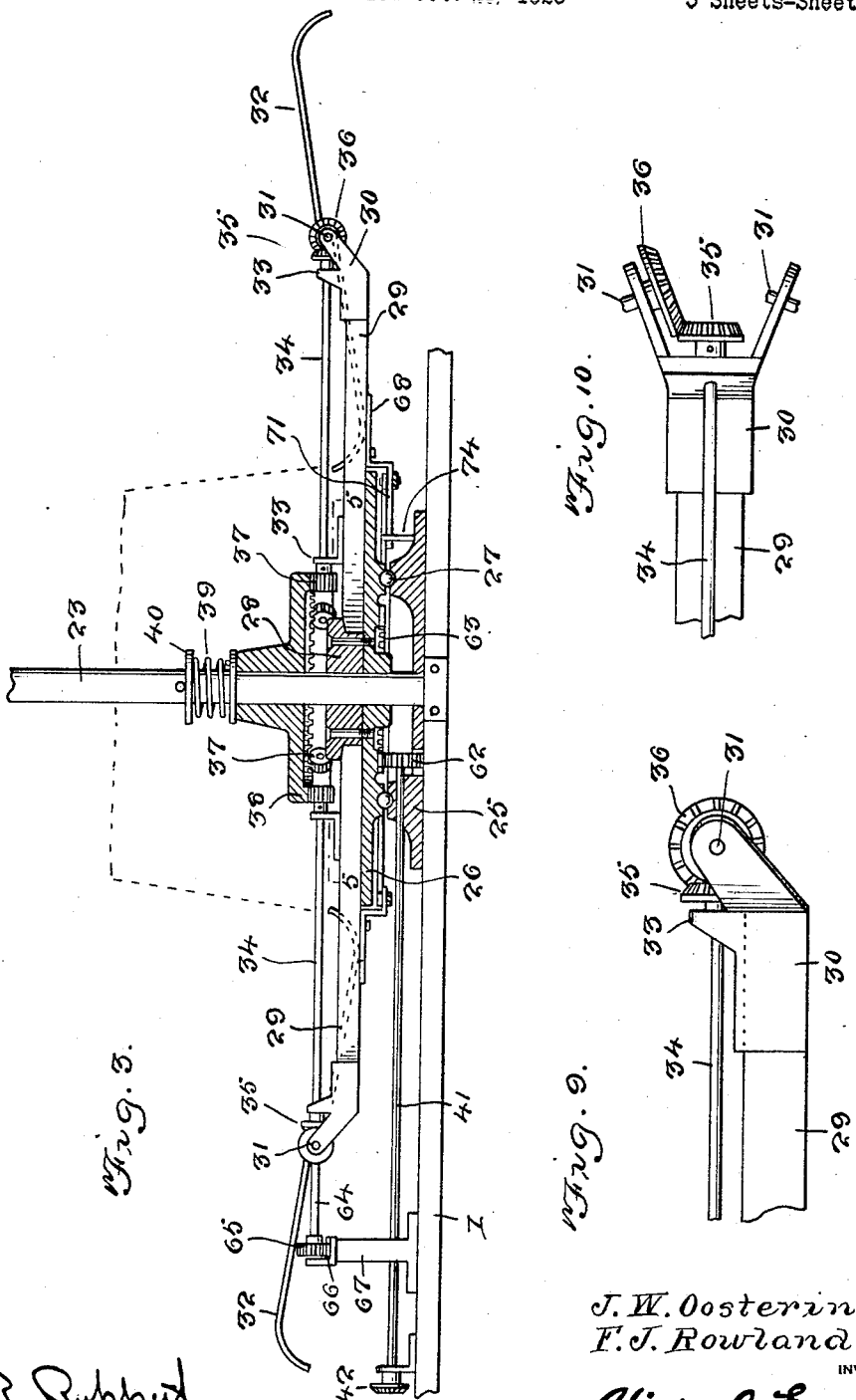

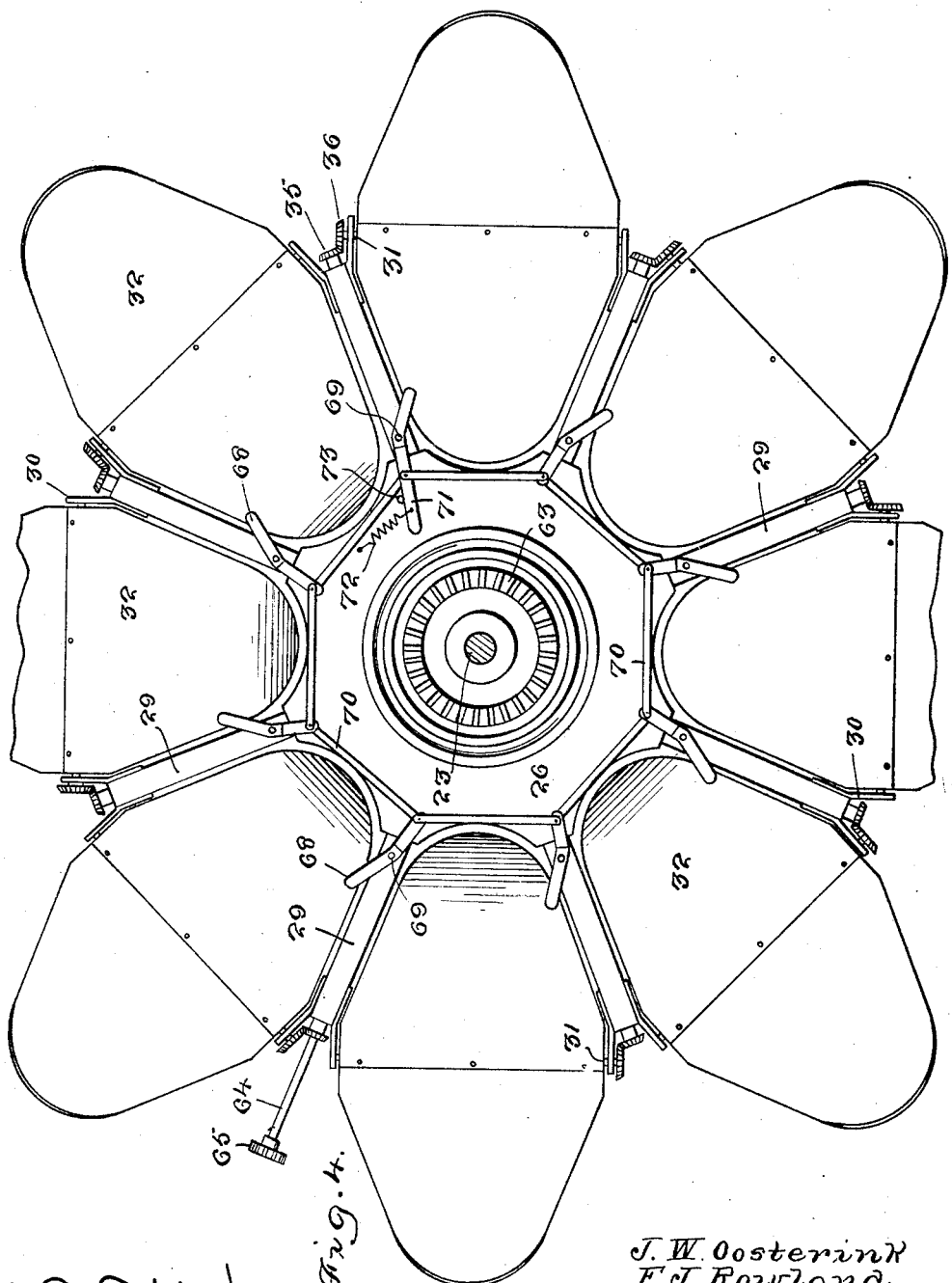

Feb. 7, 1928.
J. W. OOSTERINK ET AL
1,658,687
SHOCK FORMING ATTACHMENT FOR HARVESTERS
Filed Oct. 23 1925
5 Sheets-Sheet 5
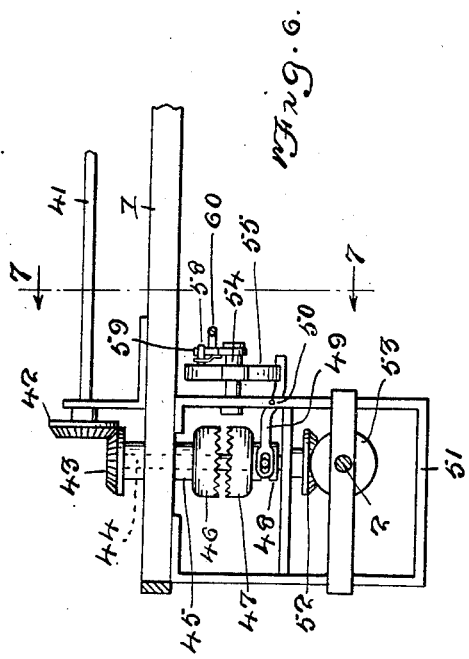
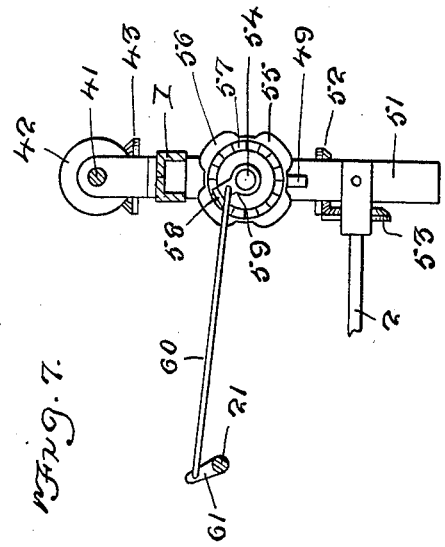
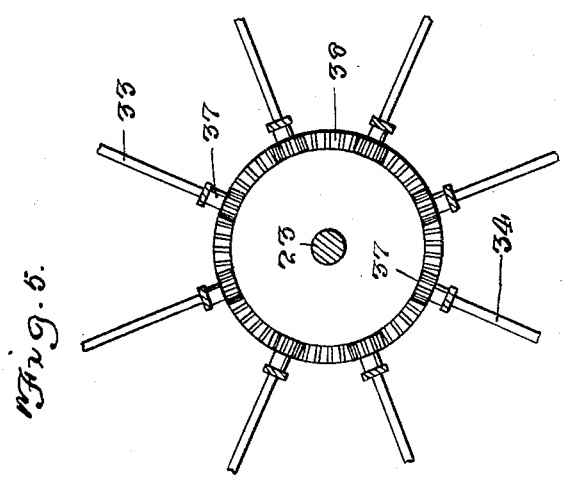
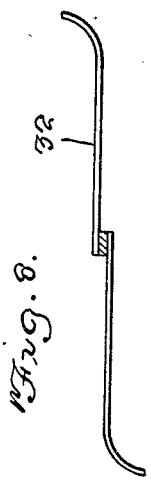

Patented Feb. 7, 1928.

1,658,687

UNITED STATES PATENT OFFICE.

JAN WILLEM OOSTERINK AND FRANCIS JOHN ROWLAND, OF SASKATOON, SASKATCHEWAN, CANADA.

SHOCK-FORMING ATTACHMENT FOR HARVESTERS.

Application filed October 23, 1925. Serial No. 64,420.

This invention relates to harvesting machinery and has for its object the provision of a novel device designed to be mounted upon a harvester as an attachment thereto and acting automatically to receive and group together the bundles of grain discharged by the harvester and to form them into shocks which are subsequently deposited upon the ground, the device having the great advantage of making it unnecessary to employ additional help to gather together the bundles of grain and form, manually, into shocks, as is the common practice.

An important object is the provision of a device of this character which may be manufactured as a complete and separate entity and attached to an already existing harvester without making any material changes in the construction thereof or additions thereto, it being consequently unnecessary to construct a specially designed harvester for the purpose.

A further object of the invention is to provide a shock forming machine of this character including means for supporting the individual bundles of grain received from the harvester until such time that the sufficient number of bundles have been grouped together to form a complete shock, the device further including an automatic trip mechanism whereby the completed shock will be deposited upon the ground and the various parts be restored to initial or normal position ready to have another shock form thereon.

The object of the invention, more particularly stated, is to provide a shock forming machine embodying a device of a supporting nature adapted to be mounted upon a harvester and carrying a rotatably mounted carrier having a series of elements thereon for supporting bundles of grain discharged from the harvester, the construction and operation being such that upon the completion of a revolution of the rotary carrier the supporting element for the grain bundles will be moved to effect depositing of the shock formed by the various bundles upon the ground.

The invention further contemplates the provision of a device of this character embodying various novel features in the structural arrangement and the combination of parts whereby to insure rapidity in action, ease of control and operation, all of these various improvements manifestly constituting a distinct improvement in the art.

With the above and other objects and advantages in view, the invention consists in the details of construction, and the arrangement and combination to be hereinafter more fully described and claimed, and illustrated in the accompanying drawing, in which:—

Figure 1 is a plan view of the complete device showing it attached to a portion of a harvester, the hood for the bundles being removed in this view.

Figure 2 is a side elevation of what is disclosed in Figure 1 with the hood member in position.

Figure 3 is a cross sectional view taken on the line 3—3 of Figure 1.

Figure 4 is a horizontal sectional view taken on the line 4—4 of Figure 2, and looking upwardly.

Figure 5 is a detail horizontal section taken on the line 5—5 of Figure 3.

Figure 6 is a fragmentary view giving a detailed illustration, in elevation, of the clutch mechanism for controlling the action of the bundle carrier.

Figure 7 is a cross sectional view taken on the line 7—7 of Figure 6 and looking in the direction of the arrows.

Figure 8 is a detail sectional view showing the side or edge elevations of the pans.

Figure 9 is a fragmentary side elevation of a portion of the mechanism illustrating certain features of the drive mechanism, and Figure 10 is a top plan view of what is shown in Figure 9.

Referring more particularly to the drawings, the letter A designates a portion of a harvester and B represents the kicker shaft therein driven by any suitable means through the instrumentality of a chain C engaged about a sprocket D.

In carrying out the invention we provide a suitable frame designated broadly by the numeral 1, which frame may be of any desired size, shape and material and constructed of any preferred or necessary number of parts, such details being immaterial to a clear understanding of the invention. The manner of mounting the frame with respect to the harvester mechanism is likewise a mere detail which could be varied without departing from the spirit of the invention in any respect. Mounted within the frame 1 are shafts 2 and 3 journaled within any suitable bearings and carrying rollers 4 and 5 about which is engaged an endless belt or apron 6 preferably provided with transverse slots or cleats 7 and defining an elevator receiving the bundles of grain, designated by the letter E, discharged from the harvester itself. The shaft 2 carries a sprocket 8 about which is trained a chain 9 in turn trained about a sprocket 10 on the shaft B so that when the shaft B is driven by whatever means is provided the elevator apron or conveyor structure 6 will be operated to carry the bundles of grain discharged from the harvester into a receiver 11 likewise mounted upon the frame and receiving from the conveyor 6.

The numeral 12 designates a rod and secured to or formed as a continuation of the member A and carrying fingers 13. On the rod 12 is a sleeve 12ª carrying a bevel gear 14 meshing with a bevel gear 15 on a short shaft 16 suitably mounted. The shaft 16 also carries a disk 17 equipped with a wrist pin 18 with which is connected a pitman 19 in turn connected with a crank 20 on one end of a shaft 21 which is formed with a crank portion 22 located beneath and secured to the receiver 11. Obviously, when the sleeve 12ª is rotated the shaft 21 will be correspondingly rotated so that the bundles passing from the harvester onto the conveyor 6 and thence into the receiver 11 will be deposited onto the shock forming device itself.

The shock forming device just referred to is of course carried by the frame 1 and includes a stationary upstanding shaft 23 upon the upper end of which is mounted a guard 24 which may be of an open frame-like construction and which is preferably shaped to form a portion of a sphere. The frame 1 carries a stationary support 25 upon which is rotatably mounted a table 26, both of these elements being formed with suitable races in which are engaged bearing balls 27 for the purpose of reducing friction. The table member 26 carries a bearing member 28 at its top from which radiate arms 29 secured thereto and to the table 26 by any preferred or suitable means. At the ends of the arms are angular bracket members 30, adjacent ones of which journally support shafts 31 on which are mounted substantially eliptical shaped pan members 32 for supporting the bundles of grain. In the present instance it will be observed that there are eight of these pan members provided although this is merely for purposes of illustration as a greater or less number may be used if preferred, depending upon the size of the shock to be formed or the size of the bundles constituting the same. Journaled along the arms 29 in suitable bearings 33 thereon are radially extending shafts 34 which have their outer ends carrying bevel gears 35 meshing with bevel gears 36 on the shafts 31, it being observed that each shaft 31 is provided at only one end with a bevel gear. Obviously, when the shafts 34 are rotated, the engagement of the gears 35 and 36 will effect tilting of the pan members 32 so that the bundles supported thereon will be deposited upon the ground.

The inner ends of the shafts 34 carry spur gears 37 meshing with a circular rack or crown gear 38 which is rotatably mounted upon the upstanding shaft or post 23 and which is urged downwardly into close engagement with the gears or pinions 37 by means of a suitable coil spring 39 bearing against a stop collar on the shaft or post 23. Journaled on the stationary frame 1 and beneath the table is a shaft 41 upon one end of which is a bevel gear 42 meshing with a bevel gear 43 rotatably mounted upon a shaft 44 and carrying a sleeve 45 terminating in a clutch element 46. Splined upon the shaft 44 is a second clutch element 47 carrying or formed upon a grooved collar 48 with which cooperates a shifting lever 49 pivoted at 50 upon a bracket or auxiliary frame structure 51 suitably mounted on the frame 1. At its lower end the shaft 44 carries a bevel gear 52 meshing with a bevel gear 53 on the shaft 2.

Projecting from one side of the frame or bracket structure 51 is a stub shaft 54 upon which is rotatably mounted a cam 55 having a plurality of high points 56 corresponding in number to one half the number of pan members 32 of the rotatable shock forming device. The cam 55 has a ratchet face 57 with which cooperates a pawl 58 mounted on an arm 59 rotatable upon the stub shaft 54. Pivotally connected with the arm 59 is a link or rod 60 which is in turn pivotally connected with a crank arm 61 on the shaft 21. The shaft 41, above described, has its inner end provided with a spur gear 62 meshing with a circular rack or crown gear 63 on the underside of the table or platform 26. Obviously, when the shaft 41 is driven the platform or table 26 carrying all of the pans 32 will be rotated, the rotation being step by step on account of the intermittent driving of the shaft 41. One of the shafts 34 is provided with an extension 64 carrying a spur gear 65 adapted to mesh with a segmental rack 66 carried by an upstanding bracket 67 mounted on the frame 1.

While it is true that the pan members 32 are pivotally supported from the arm 29 so as to be capable of being inverted for the purpose of depositing the formed shock upon the ground, it is necessary to provide means for preventing accidental or unintentional swinging of these pan members. It should also be mentioned in passing, that these pan members have both ends exactly alike so that either end may be the inner or either the outer end, depending upon circumstances and the action of the mechanism as will be described. The means for normally preventing the pan members from rotating with the shafts upon which they are mounted comprises a plurality of latch fingers 68 pivoted at 69 upon the arms 29 and having their outer ends disposed beneath the inner ends of the pans 32 as clearly indicated in Figure 4. The inner ends of the latch fingers 68 are all pivotally connected by means of intermediate links 70 as clearly indicated in the same figure, and one latch finger is provided with an inward extension 71 with which is connected a coil spring 72 suitably anchored to the underside of the turn table whereby to hold all of the latch fingers in operative position, a stop 73 being provided for limiting the movement of this extension.

Carried by the stationary support 25 is an upstanding pin 74 disposed in the path of travel of the extension 71 on the above described latch finger whereby upon engagement with this upstanding pin the latch member having the extension, and consequently all the others will be swung so that the outer ends thereof will be removed from obstructing relation to the pan members 32 so that the latter may tilt and deposit the shock or bundles of grain upon the ground. The pan members 32 are so balanced that after this action occurs they will return to normal position by the simple process of swinging entirely over and by the time they have reached this position the extension 71 will have passed by the pin 74 so that the spring 72 will return all of the latch fingers to their normal positions in obstructing relation to the pans 32 for holding the latter temporarily stationary.

In the operation of the device it will be seen that the shafts 12 and 2 are constantly rotating but that the shaft 44 rotates freely within the gear 43 except when the clutch members 46 and 47 are in engagement. The bundles of grain discharged from the harvester of course pass along or are carried upwardly by the conveyor 6 to the receiver 11 and every time the gear 15 is rotated through a complete revolution, the wrist pin 18 thereon connected by means of the link or pitman 19 with the crank 20 on the shaft 21 will operate to turn the latter so that the crank portion 22 thereon mounted beneath and carrying the receiver 11 will act to swing this receiver upwardly and toward the rotatable shock forming device or carrier. As the shaft 21 is rotated or rocked, the latter being the preferable and more direct term, the crank arm 61 thereon will operate to move the link or rod 60 and consequently the arm 59 carrying the pawl 58 so that the cam 55 will be driven step by step by virtue of the pawl and ratchet action. The mechanism is so termed that at every complete movement of the shaft 21, back and forth, the cam 55 will be rotated a quarter turn so that one of the high points 56 thereon will engage the shifting fork or lever 49 and swing it upon its pivot 50 to bring the clutch member 47 into engagement with the clutch member 46. When this is done the shaft 44 is locked for rotation by the shaft 2 and the gear 43 on the shaft 44 meshing with the gear 42 will act to rotate the shaft 41 carrying the spur gear 62 which meshes with the crown gear 63 on the underside of the rotatable table or platform 26. The parts are so timed that the rotatable platform or shock carrier will be given a one-eighth turn and in this way it is obvious that the successive pan members 32 are brought into proper position to receive the successive bundles of grain fed thereonto by the tilting action of the receiver 11. After the shock carrier has made a complete revolution the spur gear 65 on the extension shaft 64 will come into engagement with the segmental rack 66 and at the same time the extension 71 on one latch finger will come into engagement with the upstanding pin 74 so that all of the latch fingers will be swung into non-obstructing relation to the inner ends of the pan members 32. When the spur gear 65 has come into engagement with the segmental or arcuate rack 66 and the rotative movement of the shock carrier is continued, it is obvious that the shaft 64 will be rotated so that the gear 39 will operate to turn the crown gear 38. As the latter mentioned crown gear is in mesh with all of the spur gears 37 it is obvious that all of the shafts 34 will then be driven and this will result in rotation of the gears 35 and 36 so that the shafts 31 will be turned, carrying with them the pans 32 and permitting the completed shock formed by the various bundles, eight in the present instance, to slide downwardly and be deposited upon the ground. Owing to the particular construction and peculiar mounting of the pan members 32 it is obvious that they will continue to turn, after the bundles have been deposited and return to normal position. By this time the extension 71 on the elongated latch finger has moved past the stop pin 74 so that the spring 72 will have returned all of the latch fingers to normal position engaged by the pan members 32 for holding the latter stationary. The operation is then continued in exactly the same manner until the next shock has been formed and deposited, and the entire action is repeated as long as the mechanism is in operation.

From the foregoing description and a study of the drawings it is apparent that we have thus provided a comparatively simple device for the purpose specified and one which will act practically automatically, no attention being required other than to see that the various parts are in their proper relation. It is believed that the construction, operation and advantages will be readily apparent to one skilled in the art without further explanation.

While we have shown and described the preferred embodiment of the invention, it is of course to be understood that we reserve the right to make all such changes in the form, construction and arrangement of parts as will not depart from the spirit of the invention or the scope of the subjoined claims.

Having thus described the invention, we claim:

1. The combination with a harvester, of a shock forming device comprising a conveyor receiving from the harvester, a movably mounted receiver receiving bundles of grain from said conveyor, a rotatable former including a plurality of pivotally mounted supports adapted to receive successive bundles of grain discharged thereonto by the receiver, and means for rotating said former step by step.

2. The combination with a harvester, of a shock forming device comprising a conveyor receiving from the harvester, a movably mounted receiver receiving bundles of grain from said conveyor, a rotatable former including a plurality of pivotally mounted supports adapted to receive successive bundles of grain discharged thereonto by the receiver, and means for rotating said former step by step, and means for discharging the bundles of grain onto the ground.

3. In combination with a harvester, a shock forming device comprising an endless conveyor receiving bundles of grain from the harvester, a movably mounted receiver receiving bundles of grain from the conveyor, a rotatable carrier including a plurality of pivotally mounted supports adapted to receive successive bundles of grain from said receiver, means for intermittently moving said carrier, means normally holding the individual supporting members against pivotal movement, and means for simultaneously releasing said holding means.

4. In combination with a harvester, a shock forming device comprising an endless conveyor receiving bundles of grain from the harvester, a movably mounted receiver receiving bundles of grain from the conveyor, a rotatable carrier including a plurality of pivotally mounted supports adapted to receive successive bundles of grain from said receiver, means for intermittently moving said carrier, means normally holding the individual supporting members against pivotal movement, and means for simultaneously releasing said holding means, and means for simultaneously swinging all of said individual supports subsequent to the release of said holding means.

5. In combination with a harvester, a shock forming device comprising an endless conveyor receiving bundles of grain from the harvester, a movably mounted receiver receiving bundles of grain from the conveyor, a rotatable carrier including a plurality of pivotally mounted supports adapted to receive successive bundles of grain from said receiver, means for intermittently moving said carrier, means normally holding the individual supporting members against pivotal movement, and means for simultaneously releasing said holding means, the holding means comprising a plurality of pivoted latch arms disposed in obstructing relation to the path of movement of the individual support, means connecting all of said latch fingers, one of said latch fingers having an extension thereon, and a stop member disposed in the path of movement of said extension for simultaneously releasing all of said latch fingers.

6. In a machine of the character described, a frame adapted to be mounted upon a harvester, an endless conveyor mounted in said frame, a movably mounted receiver receiving bundles of grain from the conveyor, means for moving the receiver, a rotatably mounted carrier on the frame, said carrier including a turn-table and radial arms, a plurality of supporting pans pivotally mounted between successive arms, means normally holding the pans in operative position for receiving successive bundles of grain discharged from said receiver, and means operated by movement of said receiver for moving the carrier intermittently.

7. In a machine of the character described, a frame adapted to be mounted upon a harvester, an endless conveyor mounted in said frame, a movably mounted receiver receiving bundles of grain from the conveyor, means for moving the receiver, a rotatably mounted carrier on the frame, said carrier including a turn-table and radial arms, a plurality of supporting pans pivotally mounted between successive arms, means normally holding the pans in operative position for receiving successive bundles of grain discharged from said receiver, and means operated by movement of said receiver for moving the carrier intermittently, means for simultaneously releasing all of said holding means, and means operable upon completion of a revolution of the carrier for simultaneously rotating all of the pan members to deposit the bundles thereon onto the ground.

8. In a machine of the character described, a supporting frame adapted to be mounted upon a harvester, an endless conveyor mounted in the frame and driven by the harvester mechanism, a rockably mounted receiver located adjacent the discharge end of the conveyor and receiving bundles of grain therefrom, a shaft rising from the frame, a carrier rotatably mounted upon said shaft and including a central supporting element and a plurality of arms radiating therefrom, pan members pivotally mounted intermediate their ends between the adjacent arms and swingable in vertical planes, means normally holding said pans against swinging movement, drive mechanism operatively connected with the carrier and the operating means for said receiver for rotating the carrier step by step to bring the successive pan members into receiving position to receive bundles of grain discharged by said receiving member, means for simultaneously releasing the holding means for the pans, and means for simultaneously rotating all of said pans to deposit the bundles of grain onto the ground.

9. In a machine of the character described, a supporting frame adapted to be mounted upon a harvester, an endless conveyor mounted in the frame and driven by the harvester mechanism, a rockably mounted receiver located adjacent the discharge end of the conveyor and receiving bundles of grain therefrom, a shaft rising from the frame, a carrier rotatably mounted upon said shaft and including a central supporting element and a plurality of arms radiating therefrom, pan members pivotally mounted intermediate their ends between the adjacent arms and swingable in vertical planes, means normally holding the pans against swinging movement, drive mechanism operatively connected with the carrier and the operating means for said receiver for rotating the carrier step by step to bring the successive pan members into receiving position to receive bundles of grain discharged by said receiving member, means for simultaneously releasing the holding means for the pans, and means for simultaneously rotating all of said pans to deposit the bundles of grain onto the ground, said last named means comprising a crown gear rotatably mounted on said upstanding shaft, a plurality of radial shafts carrying spur gears in mesh with said crown gear, bevel gears on said shafts, a shaft journaled through the adjacent arms and carrying the pan members, bevel gears on said last named shaft meshing with said first named bevel gears, one of said radial shafts having an extension thereon carrying a spur gear, and an arcuate rack disposed in the path of movement of said last named gear.

10. In a machine of the character described, a frame adapted to be mounted upon a harvester, a shaft journaled in said frame and driven by the harvester mechanism, an endless conveyor driven by said shaft and receiving bundles of grain from the harvester, a rockably mounted receiver receiving bundles of grain from the conveyor, a rotatably mounted carrier on the frame including a turntable having a crown gear at the center thereof and further including a plurality of radial arms, pan members pivoted between the successive arms, a shaft carrying a gear meshing with said crown gear, a clutch mechanism between the first and last named shafts, and means operated by movement of the receiver for meshing and unmeshing said clutch mechanism.

11. In a machine of the character described, a frame adapted to be mounted upon a harvester, a shaft journaled in said frame and driven by the harvester mechanism, an endless conveyor driven by said shaft and receiving bundles of grain from the harvester, a rockably mounted receiver receiving bundles of grain from the conveyor, a rotatably mounted carrier on the frame including a turntable having a crown gear at the center thereof and further including a plurality of radial arms, pan members pivoted between the successive arms, a shaft carrying a gear meshing with said crown gear, a clutch mechanism between the first and last named shafts, and means operated by movement of the receiver for meshing and unmeshing said clutch mechanism, said last named means comprising a crank arm on a shaft carrying the receiver, a lever operatively connected with the clutch mechanism, a cam engaging said lever, and a pawl and ratchet mechanism operated by movement of the receiver operating shaft for rotating said cam.

12. In combination with a harvester, a shock forming device comprising a conveyor for receiving bundles of grain from the harvester, a rotatably mounted former adapted to have the bundles of grain deposited thereon, said former including a plurality of normally substantially horizontal swingably mounted supports, means normally holding said supports in horizontal position, and means for releasing said support to permit downward swinging thereof for depositing the bundles of grain upon the ground.

13. The combination with a harvester, of a shock forming device comprising a rotatable former including a plurality of pivotally mounted supports adapted to receive successive bundles of grain discharged thereonto, means normally maintaining said supports in substantially horizontal position, and means for releasing said retaining means to permit downward swinging of the supports for depositing the bundles of grain upon the ground.

In testimony whereof we affix our signatures.

FRANCIS JOHN ROWLAND.
JAN WILLEM OOSTERINK.